(12) United States Patent
Kikuchi et al.

(10) Patent No.: US 6,502,056 B2
(45) Date of Patent: Dec. 31, 2002

(54) METHOD AND APPARATUS FOR MEASURING GEOMETRY ELEMENTS

(75) Inventors: Naoya Kikuchi, Kawasaki (JP); Hirokazu Michiwaki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 16 days.

(21) Appl. No.: 09/795,433

(22) Filed: Mar. 1, 2001

(65) Prior Publication Data

US 2001/0027381 A1 Oct. 4, 2001

(30) Foreign Application Priority Data

Mar. 1, 2000 (JP) ........................... 2000-056338

(51) Int. Cl.[7] .............. G01B 5/00; G01B 7/00
(52) U.S. Cl. ............... 702/155; 702/150; 702/170; 33/503; 33/504
(58) Field of Search .................. 702/33, 36, 150, 702/152, 153, 155, 168, 170; 33/503, 504, 556

(56) References Cited

U.S. PATENT DOCUMENTS

| 5,222,034 A | * | 6/1993 | Shelton et al. ............ 702/152 |
| 5,434,803 A | | 7/1995 | Yoshida |
| 5,526,576 A | * | 6/1996 | Fuchs et al. ................. 33/503 |
| 5,590,060 A | | 12/1996 | Granville et al. |
| 5,781,450 A | * | 7/1998 | Glasson ...................... 702/153 |
| 5,819,202 A | * | 10/1998 | Sato et al. ..................... 702/33 |

FOREIGN PATENT DOCUMENTS

| JP | 06-050749 B2 | | 2/1994 |
| JP | 08-082521 B2 | | 3/1996 |
| JP | 2967854 | * | 8/1999 |

* cited by examiner

Primary Examiner—Bryan Bui
(74) Attorney, Agent, or Firm—Oliff & Berridge, PLC

(57) ABSTRACT

A distribution of sample points, which are obtained by a two or three-dimensional coordinate measuring machine, is examined to classify into zero through third degrees. A geometry element is discriminated on the basis of the distribution of the sample points (zero through third degrees) and the number of the sample points. When the number of the sample points is equal to 2 or more and the distribution of the sample points is of the second degree, the geometry element can be discriminated as a plane or a circle in consideration of the probe moving direction. When the number of the sample points is equal to 6 or more, the geometry element can be discriminated as a cylinder or a circular cone on the basis of calculation of a half vertical angle of a circular cone that is specified from the sample points.

9 Claims, 9 Drawing Sheets

METHOD AND APPARATUS FOR MEASURING GEOMETRY ELEMENTS

BACKGROUND OF THE INVENTION

1. Field of the Invention

The present invention relates to a method and apparatus for measuring geometry elements, which calculates geometry elements to be measured, on the basis of measured data obtained from a measuring machine such as a three-dimensional coordinate measuring machine and a form measuring instrument, and outputs them as measured results.

2. Description of the Related Art

A three-dimensional coordinate measuring machine is employed to measure geometry elements of works to be measured, such as points, lines, planes, circles, spheres, cylinders and cones. The machine first indicates a geometry element to be measured from a console then measures significant number of points required for measuring the geometrical form. For example, if the geometry element is a point, a probe is brought into touch with a position to be measured to obtain measured data from one point. If the geometry element is a plane, it is required to obtain measured data from at least three points on that plane. Then, some computational operations are executed to derive the indicated geometry element from one or more measured data.

In such the method of measuring, however, an operation for indication of geometry element is required during an interval between measurement operations by the probe directly or using a joystick, resulting in a lowered operability and causing a measurement error. JP 8-82521A proposes another method of measuring geometry elements, which omits the indication of geometry element to improve the operability. This method receives measured data of a work to be measured and applies the measured data in arithmetic expressions for respective geometry forms previously stored. It compares formal errors obtained from the arithmetic expressions and determines a geometry form with the minimum formal error as the geometry element to be measured.

SUMMARY OF THE INVENTION

The present invention has a first object to provide a method and apparatus for measuring geometry elements, which can reduce the computational complexity of data in the above-mentioned conventional method of measuring geometry elements to perform a high-speed processing.

The present invention also has a second object to provide a method and apparatus for measuring geometry elements, which can further improve the operability in the above-mentioned conventional method of measuring geometry elements.

The present invention is provided with a first apparatus for measuring geometry elements, which comprises: a measuring machine for measuring one or more sample points on a work required to calculate a geometry element which defines the work to be measured and outputting measured data; a sampling and sample processing section for receiving the measured data of the sample points measured by the measuring machine and counting the number of the sample points received; and an element discriminating section for discriminating the geometry element which defines the work to be measured on the basis of the number of the sample points received by the sampling and sample processing section and a distribution of all sample points.

The present invention is also provided with a second apparatus for measuring geometry elements, which comprises: a measuring machine for measuring one or more sample points on a work required to calculate a geometry element which defines the work to be measured and outputting measured data; a sampling and sample processing section for receiving the measured data of the sample points measured by the measuring machine and counting the number of the sample points received, the sampling and sample processing section determining the finish of reception of all sample points required to calculate the geometry element when a predetermined time is elapsed after the last measured data is received; and an element discriminating section for discriminating the geometry element which defines the work to be measured on the basis of the measured data and the number of the sample points received by the sampling and sample processing section.

The present invention is further provided with a first method of measuring geometry elements, which comprises the steps of: receiving one or more sample points on a work required to calculate a geometry element which defines the work to be measured and counting the number of the sample points received; determining a distribution of the sample points received in the step of receiving; and discriminating the geometry element to be measured on the basis of the distribution of all sample points determined in the step of determining and the number of the sample points counted in the step of receiving.

The present invention is still further provided with a second method of measuring geometry elements, which comprises the steps of: receiving one or more sample points on a work required to calculate a geometry element which defines the work to be measured and counting the number of the sample points received; determining the finish of reception of all sample points required to calculate the geometry element when a predetermined time is elapsed after the last sample point is received in the step of receiving; and discriminating the geometry element to be measured on the basis of the measured data and the number of the sample points after the finish of reception of all sample points is determined in the step of determining.

According to the first method and apparatus for measuring geometry elements of the present invention, it determines a distribution of one or more sample points on a work required to calculate a geometry element which defines the work to be measured. On the basis of the distribution and the number of the sample points, it discriminates the geometry element to be measured. Therefore, it can determine the geometry element with much lesser computational complex than that of the conventional method, which performs application processes of all geometry forms and their error calculations based on measured data, thereby greatly reducing the computational complexity of data to achieve a high-speed processing.

The measuring machine may comprise a three-dimensional coordinate measuring machine for outputting measured data that contains three-dimensional coordinates. In this case, the distribution of the sample points can be determined as any one of zero through third degrees on the basis of a thickness, width and height of the minimum rectangular parallelepiped that internally contains all sample points received.

The element discriminating process may be performed to discriminate the geometry element as: a point when the number of the sample point is equal to 1; a line when the number of the sample points is equal to 2 or more and the distribution of the sample points is of the first degree; a plane or a circle when the number of the sample points is 2 or more and the distribution of the sample points is of the second degree; a sphere when the number of the sample points is equal to 4 or 5 and the distribution of the sample points is of the third degree; and a cylinder or a circular cone when the number of the sample points is equal to 6 or more and the distribution of the sample points is of the third degree.

When the number of the sample points is equal to 2 or more and the distribution of the sample points is of the second degree, the geometry element can be discriminated as: a plane if the approaching direction for measurement which is employed when at least the last sample point is obtained (for example, the moving direction of the probe toward the position to be measured) is vertically close to a plane defined by the sample points; and a circle if the approaching direction for measurement is parallel close to a plane defined by the sample points.

When the number of the sample points is equal to 6 or more and the distribution of the sample points is of the third degree, calculation of a half vertical angle of circular cone from the measured data allows it to discriminate the geometry element as: a cylinder if the half vertical angle is equal to or less than a predetermined value; and a circular cone if the half vertical angle is larger than the predetermined value.

According to the second method and apparatus for measuring geometry elements of the present invention, during receiving one or more sample points on a work required to calculate a geometry element which defines the work on a work to be measured, it determines the finish of reception of all sample points required to calculate the geometry element when a predetermined time is elapsed after the last sample point is received. Therefore, an operator is not required to operate to indicate that measurement of required sample points is finished and he/she can concentrate all measuring operations on accessing to measuring positions by the probe to improve the measuring operability.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

Preferred embodiments of the present invention will be described below with reference to the accompanying drawings.

Figure 1:
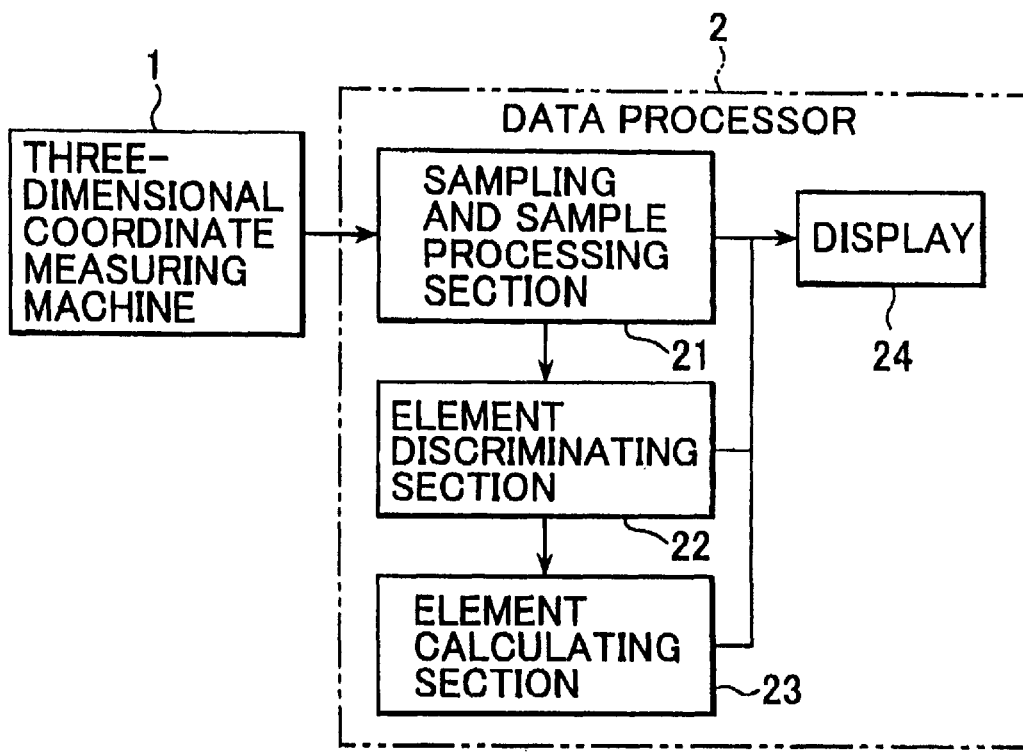
FIG. 1 is a block diagram of an apparatus for measuring geometry elements in a three-dimensional coordinate measuring system according to an embodiment of the present invention.

FIG. 1 is a block diagram of an apparatus for measuring geometry elements in a three-dimensional coordinate measuring system according to an embodiment of the present invention. This system comprises a three-dimensional coordinate measuring machine 1 and a data processor 2 that processes measured data from the three-dimensional coordinate measuring machine 1.

Figure 2:
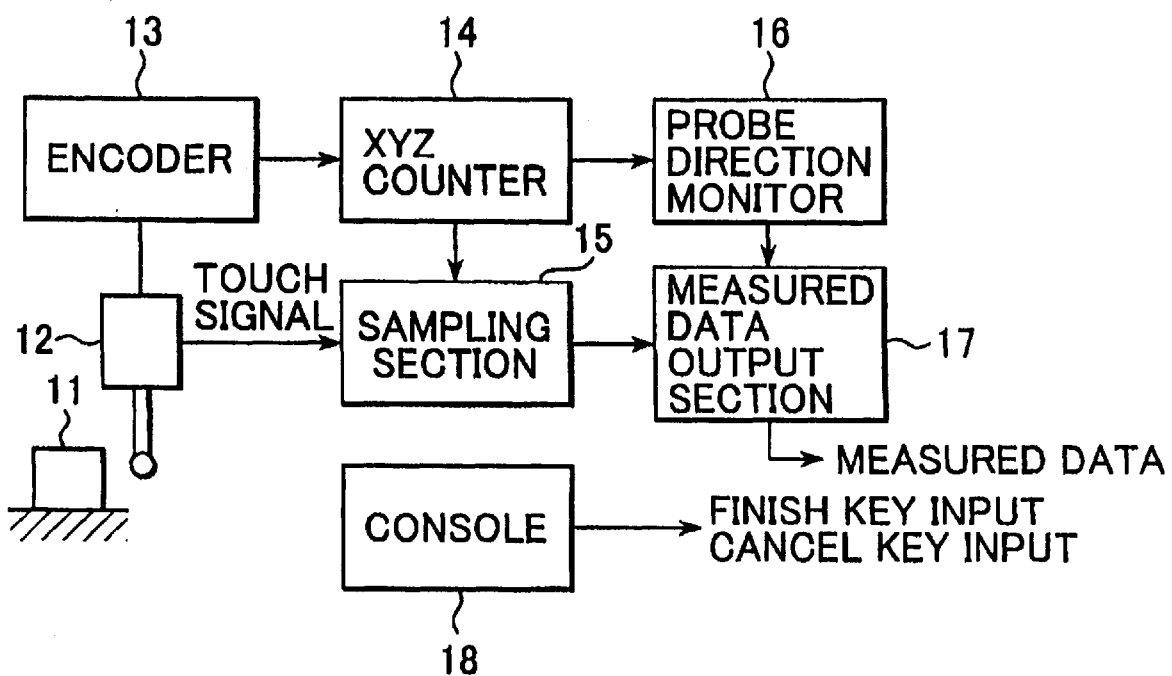
FIG. 2 is a block diagram of a three-dimensional coordinate measuring machine in the same apparatus.

The three-dimensional coordinate measuring machine 1 has such a configuration as exemplified in FIG. 2. The three-dimensional coordinate measuring machine 1 includes a touch-signal probe 12 that receives three-dimensional coordinate data of a sample point when it is brought into touch with a required position on a work 11 to be measured through a manual operation directly or using a joystick not depicted. An encoder 13 detects the movement of the touch-signal probe 12 and an XYZ counter 14 counts the position of the probe tip. The positional information (three-dimensional coordinates) of the probe 12 obtained at the XYZ counter 14 is sampled by a sampling section 15 at an input timing of a touch signal from the probe 12. On the other hand, the positional information of the probe 12 is fed from the XYZ counter 14 into a probe direction monitor 16, where it is sampled at a predetermined time interval. In addition, past positional information on two or three points are updated to new positional information so as to always hold the latest moving direction of the probe 12. A measured data output section 17 derives coordinate values of a touched point (sample point) from the measured data at the time of the touch signal input and the probe direction output from the probe direction monitor 16. The measured data output section 17 outputs the coordinate values, and the probe moving direction when the sample point is obtained, to the data processor 2 as the measured data. A console 18 is arranged to input to the data processor 2 such information that include: operational information of finish key for indicating the finish of measurement by the number of sample points required to measure a geometry element to be measured; and input information of cancel key for interrupting the determination of the finish of measurement.

As shown in FIG. 1, the data processor 2 on the other hand comprises a sampling and sample processing section 21, an element discriminating section 22, an element calculating section 23 and a display 24. The sampling and sample processing section 21 includes a function for storing measured data input from the three-dimensional coordinate measuring machine 1, and a function for counting the number of sample points input. It also includes a function for determining the finish of reception of all sample points required to calculate a geometry element when the finish key is input or when a predetermined time is elapsed after the last measured data is input. The element discriminating section 22 includes a function for determining a distribution of sample points based on the measured data fed from the sampling and sample processing section 21. The section 22 also includes a function for discriminating a geometry element which defines the work 11 to be measured on the basis of the distribution and the number of sample points. The element discriminating section 22 further includes a function for discriminating if a geometry element is a plane or a circle based on the moving direction of the probe 12 when the last measured data is obtained (hereinafter referred to as an "approaching direction"). The section 22 also includes a function for discriminating if a geometry element is a cylinder or a circular cone based on a half vertical angle derived from a circular cone calculation. The element calculating section 23 performs calculation of a geometry element (for example, if the geometry element is a circle, calculation of the center and radius of the circle) on the basis of the geometry element discriminated at the element discriminating section 22 and the measured data. The display 24 displays the number of sample points processed at the sampling and sample processing section 21, the discriminated results at the element discriminating section 22 and the calculated results at the element calculating section 23.

Operations of the apparatus for measuring geometry elements thus configured will be described next.

Figure 3:
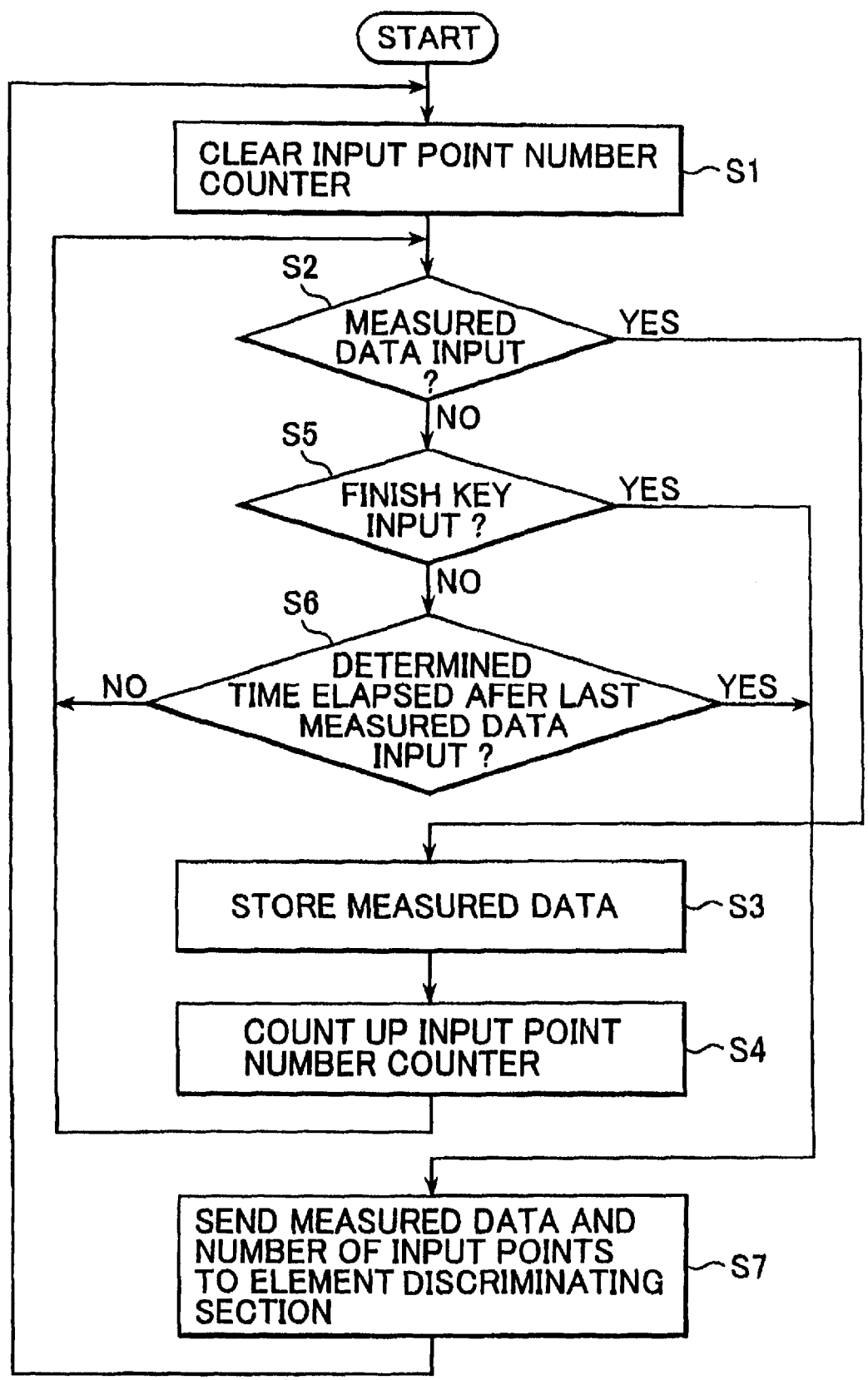
FIG. 3 is a flowchart showing operations of a sampling and sample processing section in the same apparatus.

FIG. 3 is a flowchart showing operations of the sampling and sample processing section 21.

The sampling and sample processing section 21 first clears an input point number counter for indicating the number of input points of measured data (S1) then waits measured data to be input (S2). If measured data is input, the section 21 stores the measured data in a memory not depicted (S3), then up-counts the input point number counter (S4) and returns to wait an input (S2). During repetition of these operations, if a finish key is input (S5), the section 21 provides the element discriminating section 22 with all measured data input until now and the number of input points (S7). In addition, once measured data regarding at least one point is input, if a freely pre-determined time is elapsed after the last measured data is input, the section 21 also determines that input of measured data is finished (S6). Then, the section 21 provides the element discriminating section 22 with all measured data input until now and the number of input points (S7). Instead of this single example, if a valid key such as the cancel key is pressed after input of measured data, for instance, the automatic finish operation by the time elapsed may not be performed or may be set off until next measured data will input.

Figure 4:
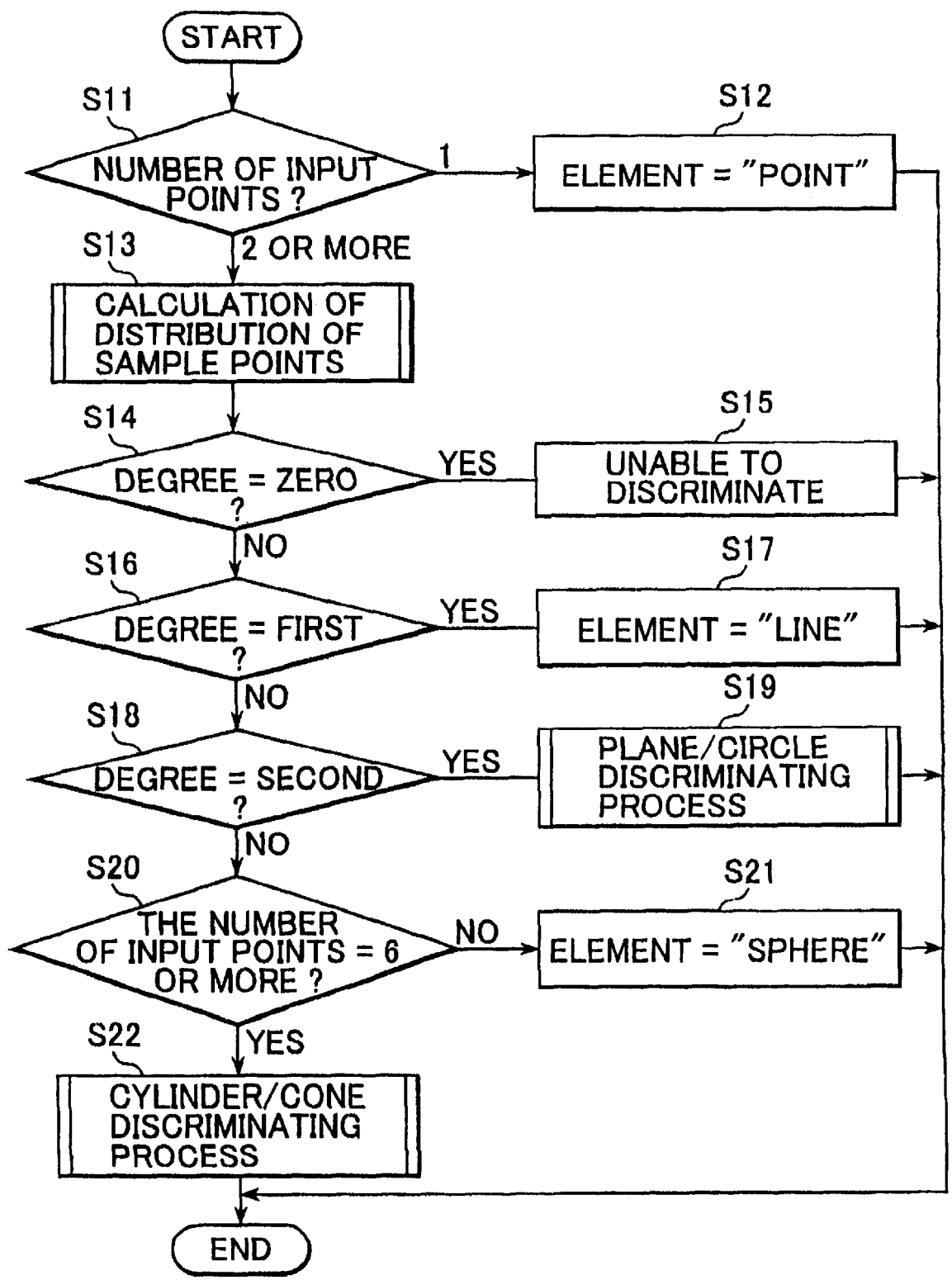
FIG. 4 is a flowchart showing operations of an element discriminating section in the same apparatus.

FIG. 4 is a flowchart showing operations of the element discriminating section 22.

If the number of input point is equal to 1, the section 22 determines the geometry element as a "point" (S12). If the number of input points is equal to 2 or more, the section 22 executes a process for calculating a distribution of sample points (S13). This distribution calculating process is described later. In a word, it discriminates if the distribution of sample points is concentrated on a single position (zero degree), linearly distributed (first degree), planely distributed (second degree) or three-dimensionally distributed (third degree). If the discriminated result is of the zero degree (S14), the section 22 determines that it is unable to discriminate the geometry element (S15). In this case, the geometry element is derived using a method similar to the conventional method. Specifically, the method designates a geometry element and calculates to display whether it is applied to the element. If the discriminated result is of the first degree (S16), the section 22 determines that the geometry element is a "line" (S17). If it is of the second degree (S18), the section 22 determines whether the geometry element is a "plane" or a "circle". In this case, a plane/circle discriminating process is executed as described later (S19). If the distribution is of the third degree (S18) and the number of input points is equal to 4 or 5 (S20), the section 22 determines that the geometry element is a "sphere" (S21). If the number of input points is equal to 6 (S20), the section 22 determines that the geometry element is a "cylinder" or a "circular cone" (S22). In this case, a cylinder/cone discriminating process (S22) is executed as described later. The following Table 1 lists the above.

TABLE 1

| Distribution Number of input points | Zero Degree | First degree | Second degree | Third degree |
| --- | --- | --- | --- | --- |
| 1 | Point | — | — | — |
| 2 | Unable to Discriminate | Line | — | — |
| 3 | Unable to Discriminate | Line | Plane or Circle | — |
| 4 | Unable to Discriminate | Line | Plane or Circle | Sphere |
| 5 | Unable to Discriminate | Line | Plane or Circle | Sphere |
| 6 or more | Unable to Discriminate | Line | Plane or Circle | Cylinder or Circular cone |

Figure 5:
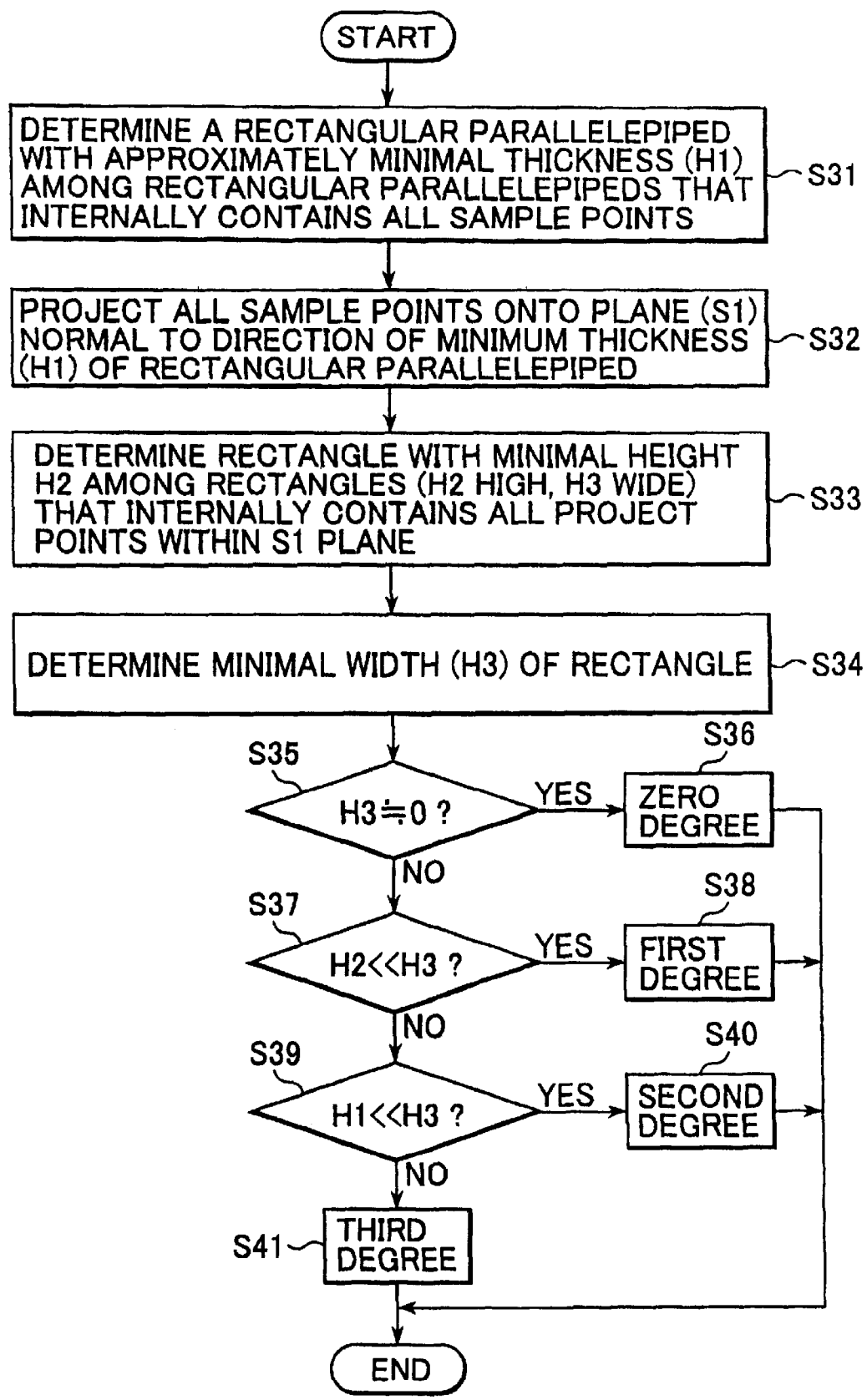
FIG. 5 is a flowchart showing a first method of calculating a distribution of sample points in the element discriminating process.
Figure 6:
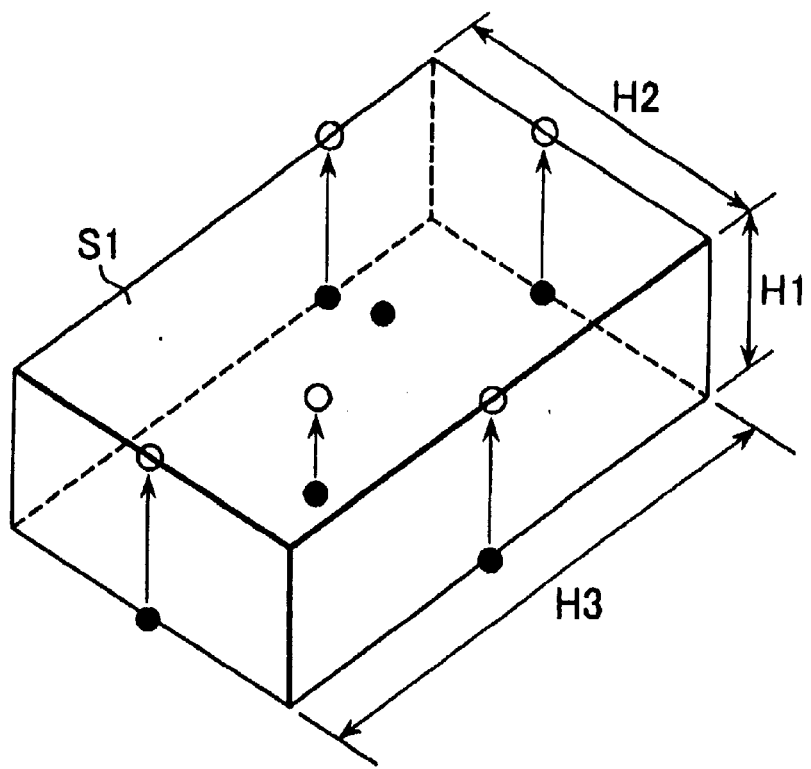
FIG. 6 illustrates the element discriminating process.

Three different methods are described herein as for the process of calculating a distribution of sample points (S13). A first method is a simple one, of which process flow is shown in FIG. 5. FIG. 6 illustrates this process.

First, among rectangular parallelepipeds that internally contain all sample points indicated with black circles in FIG. 6, a rectangular parallelepiped with a thickness (H1) that is almost minimal is determined (S31). At this moment, a height H2 and width H3 of the rectangular parallelepiped are not yet determined and may be free. Next, all sample points are projected onto a plane S1 normal to the direction of the thickness (H1) of the rectangular parallelepiped as indicated with white circles in FIG. 6 (S32). In FIG. 6, since the black circle at the center is located on the plane S1, the white circle overlaps the black circle. Subsequently, among rectangles (H2 high, H3 wide) that internally contain all points projected on the plane S1, a rectangle with the minimum height (H2) is determined (S33). Then, the minimum width (H3) of the rectangle is determined (S34). If the largest H3 is approximately equal to 0 (S35), the sample point is determined of the zero degree because it concentrates on a single point (S36). If H2<<H3 (S37), the sample points are determined of the first degree because they are distributed on a straight line (S38). If the above conditions are not satisfied and H1<<H3 (S39), the sample points are determined of the second degree because they are distributed in a plane (S40). If any conditions cannot be satisfied (S39), the sample points are determined of the third degree (S41). The condition "<<" may be substituted for another condition that determines whether the left edge is larger or smaller than 1/10 to 1/20 of the right edge.

Figure 7:
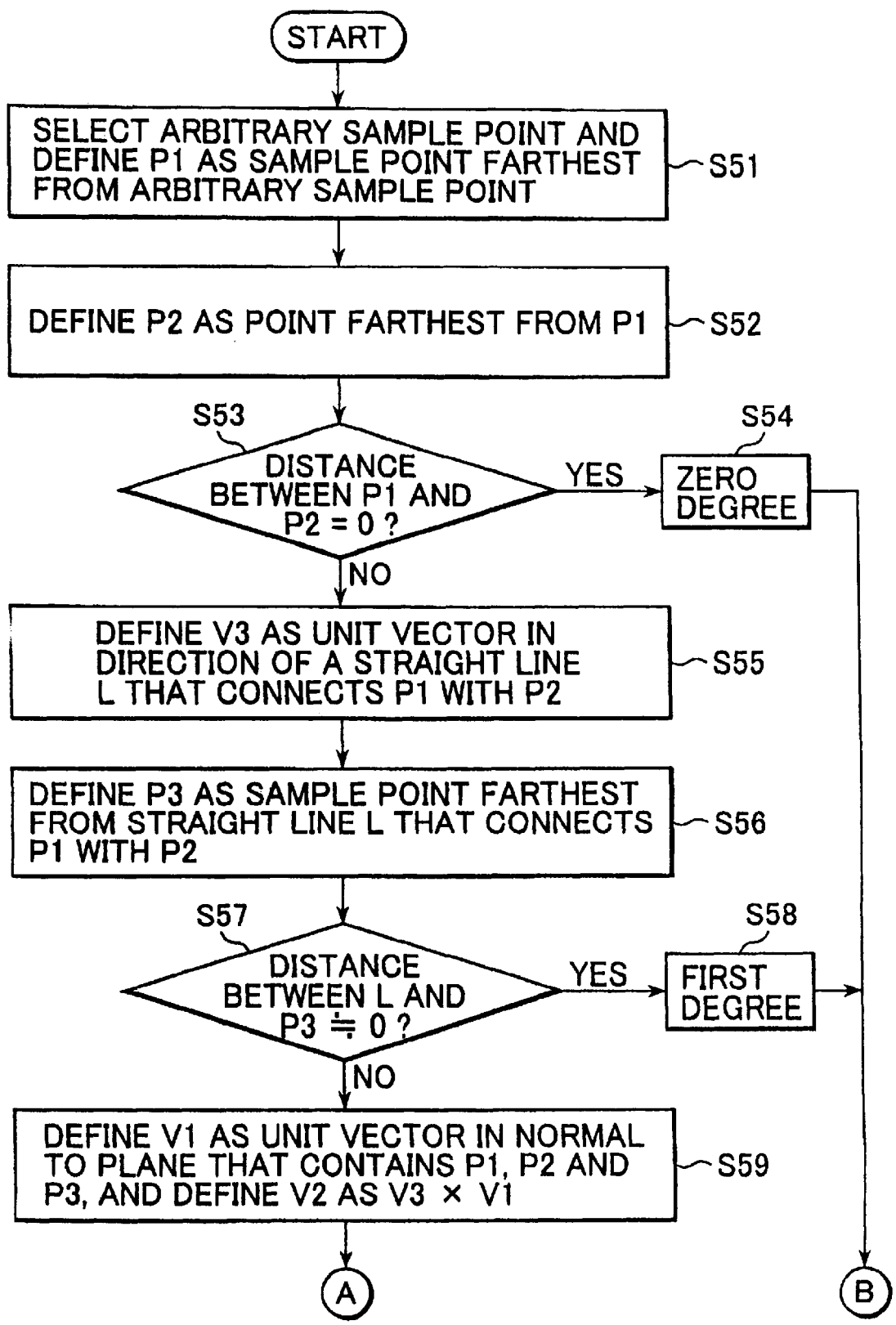
FIG. 7 is a flowchart showing a further specified process of the element discriminating process.
Figure 8:
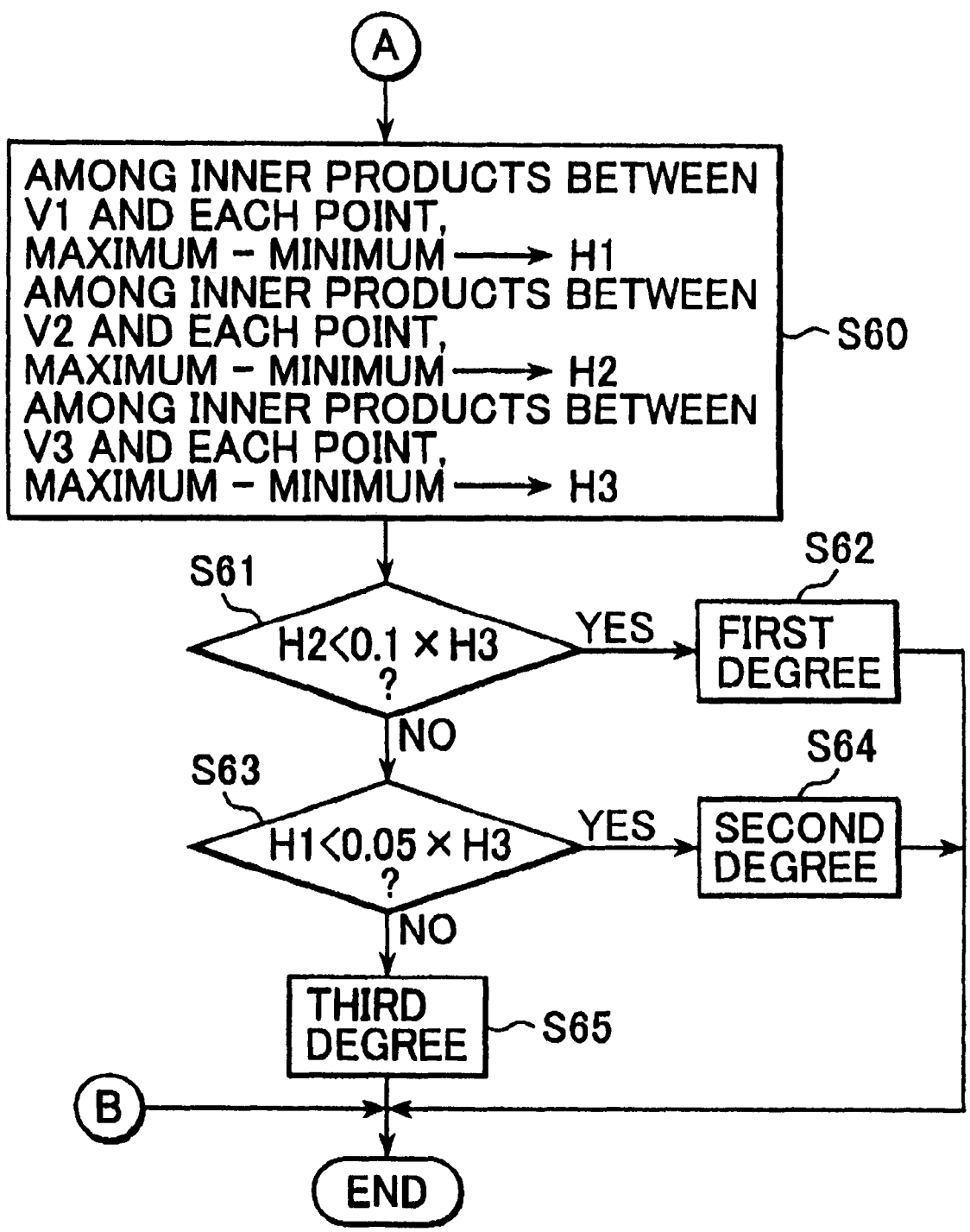
FIG. 8 is a flowchart showing a continuous process of FIG. 7.

This process can be performed specifically through execution of processes shown in FIGS. 7 and 8.

Figure 9:
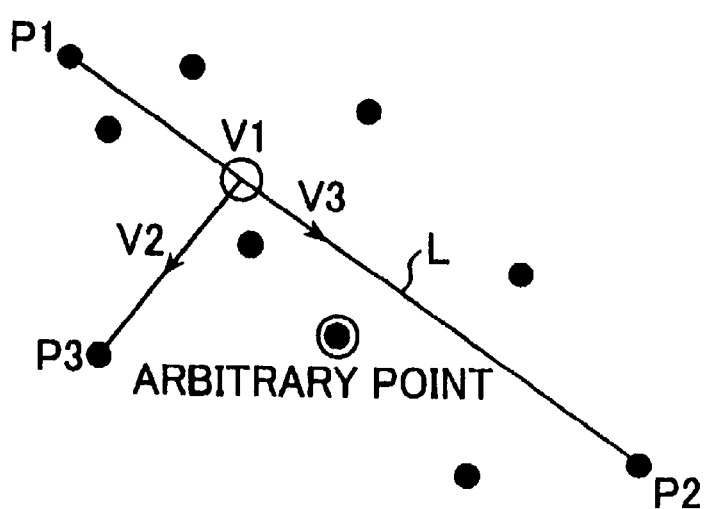
FIG. 9 illustrates processes in FIGS. 7 and 8.

First, as shown in FIG. 9, an arbitrary sample point is selected and a sample point farthest from the arbitrary sample point is sought and referred to as P1 (S51). Next, a point farthest from P1 is sought and referred to as P2 (S52). If the distance between P1 and P2 is approximately equal to 0 (S53), it is determined of the zero degree (S54). If not, a unit vector in the direction of a straight line L that connects P1 with P2 is referred to as V3 (S55), and a sample point farthest from the straight line L that connects P1 with P2 is referred to as P3 (S56). V3 may have either one of orientations. If the distance between the straight line L and P3 is approximately equal to 0 (S57), it is determined of the first degree (S58). If not, a unit vector on the normal to a plane that contains P1, P2 and P3 is referred to as V1 and an outer product, V3×V1, between V3 and V1 is referred to as V2 (S59).

Figure 10:
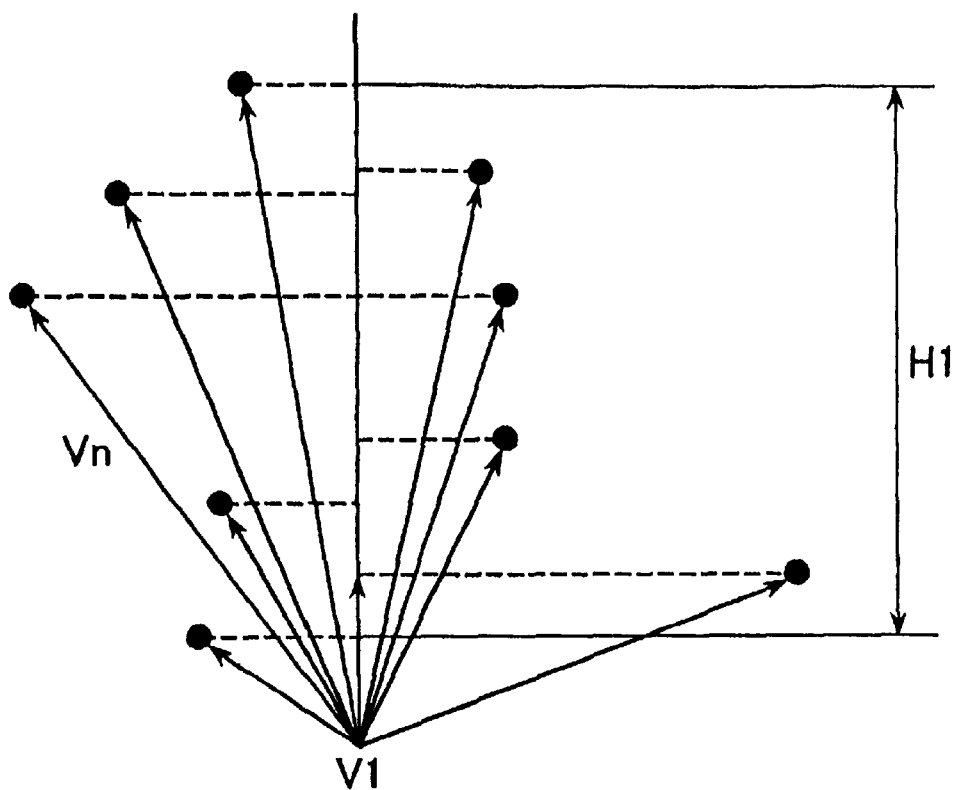
FIG. 10 illustrates processes in FIGS. 7 and 8.

Subsequently, among inner products between V1 and each sample point, the maximum minus the minimum is set to H1. Similarly, among inner products between V2 and each sample point, the maximum minus the minimum is set to H2, and among inner products between V3 and each sample point, the maximum minus the minimum is set to H3 (S60). As shown in FIG. 10, an inner product between the vector V1 and each sample point vector Vn is represented by:

$$V1 \cdot Vn = |V1| \times |Vn| \cos\theta \quad (1)$$

Therefore, a result from inner product between V1 and each point indicates a length of each sample point vector projected onto V1. Thus, the difference between the maximum and the minimum of the length gives the thickness H1 in the direction of the vector V1. Ditto for V2 and V3 directions. Through the use of H1, H2 and H3 obtained, if H2<0.1×H3 (S61), it is determined of the first degree (S62). If H1<0.05× H3 (S63), it is determined of the second degree (S64). If not, it is determined of the third degree (S65).

Strictly speaking, the above method cannot always minimize H1, H2 and H3 because it is simple. Nevertheless this method has simple calculation contents and can achieve a high-speed processing characteristically. A second method is described next, which can strictly derive a distribution of sample points.

Figure 11:
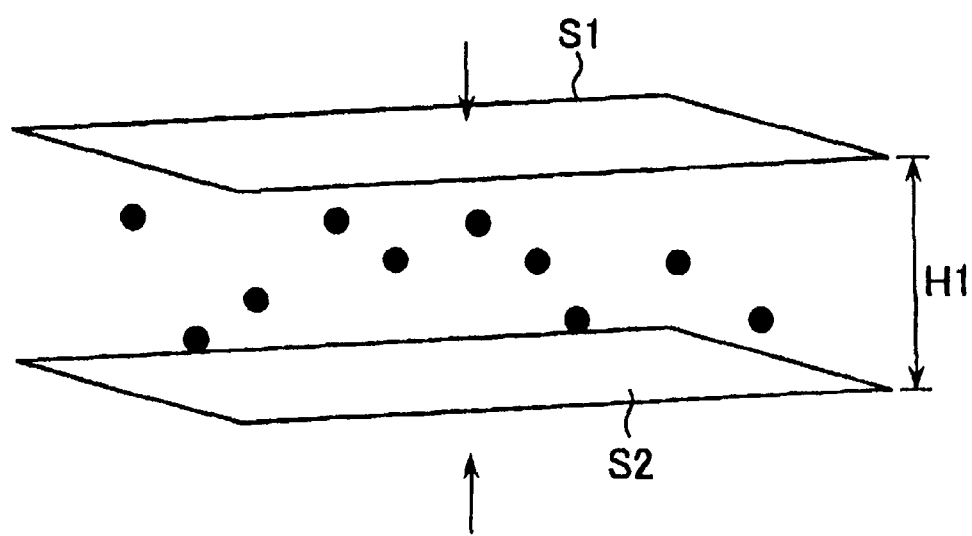
FIG. 11 illustrates a second method of calculating a distribution of sample points in the element discriminating process.

This second method employs a least region method with two planes when it determines the minimum thickness (H1) of a rectangular parallelepiped that contains internally all sample points. That is, as shown in FIG. 11, two parallel planes S1 and S2 are assumed. When these two planes sandwich all sample points, the least region method finds out such planes as to minimize the distance between the two planes. The distance between the two planes is referred to as H1. Next, all sample points are projected perpendicularly onto the plane S1 that forms the minimum thickness (H1). When a rectangle (H2 high, H3 wide) that contains internally each projected point within this plane is determined, a least region method with two lines is employed. This method assumes two straight lines. When these two straight lines sandwich all sample points, the least region method finds out such two straight lines as to minimize the distance between the two straight lines. The distance between the two straight lines is referred to as H2. Next, such two straight lines are determined that are normal to the straight line which forms H2, and that the distance between them is minimal when they sandwich all projected points. The distance between these two straight lines is referred to as H3. Thereafter, the same method of determining distribution is performed as the first method.

If two parallel lines are represented by the following equations:

$$AX1+BY1+C1=0 \quad (2)$$

$$AX2+BY2+C2=0 \quad (3)$$

(where $A^2+B^2=1$), the least region method with two parallel lines for two-dimensional data may obtain A, B and C1, C2 when two straight lines sandwich all two-dimensional data and cross at right angle and a distance between them, |C1−C2|, is minimal. A solution by the least region method with two parallel planes for three-dimensional data may be obtained in the same manner as above. The second method can perform a stricter calculation than that of the first method while it takes a longer calculation time than that of the first method.

Figure 12:
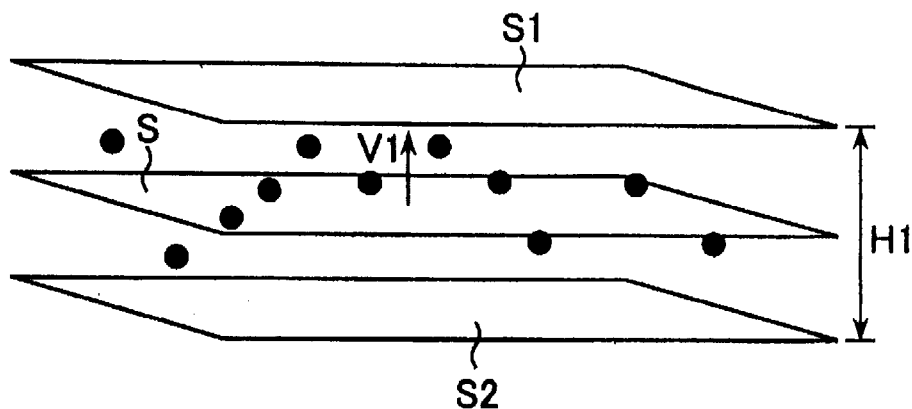
FIG. 12 illustrates a third method of calculating a distribution of sample points in the element discriminating process.

A third method will be described next. As shown in FIG. 12, on determination of the minimum thickness (H1) of a rectangular parallelepiped that internally contains all sample points, a plane S is determined by the least square method from all sample points distributed three-dimensionally. Namely, when a unit vector that indicates the direction of the plane S is referred to as V1; a position is referred to as s; and a vector at each sample point is referred to as Pi, a deviation between the straight line L and each points is represented by:

$$\text{Deviation} = V1 \cdot Pi - s \quad (4)$$

(where "·" denotes inner product), the desired plane S is a plane given by V1 and s that minimize:

$$\Sigma(V1 \cdot Pi - s)^2 \quad (5)$$

Next, two parallel planes S1 and S2 that are parallel to the above plane are assumed. When these two planes sandwich all sample points, the method finds out such planes as to minimize the distance between the two planes. The distance between the two planes is referred to as H1. Next, all sample points are projected perpendicularly onto the plane that forms the minimum thickness (H1). When a rectangle (H2 high, H3 wide) that contains internally each projected point within this plane is determined, a single straight line is determined from all projected points by the least square method. Next, two straight lines that are parallel to the straight line are assumed. When these two straight lines sandwich all sample points, this method finds out such two straight lines as to minimize the distance between the two straight lines. The distance between the two straight lines is referred to as H2. Next, such two straight lines are determined that are normal to the straight line which forms H2, and that the distance between them is minimal when they sandwich all projected points. The distance between these two straight lines is referred to as H3. Thereafter, the same method of determining distribution is performed as the second method. The third method has an intermediate effect between the first and second methods.

Figure 13:
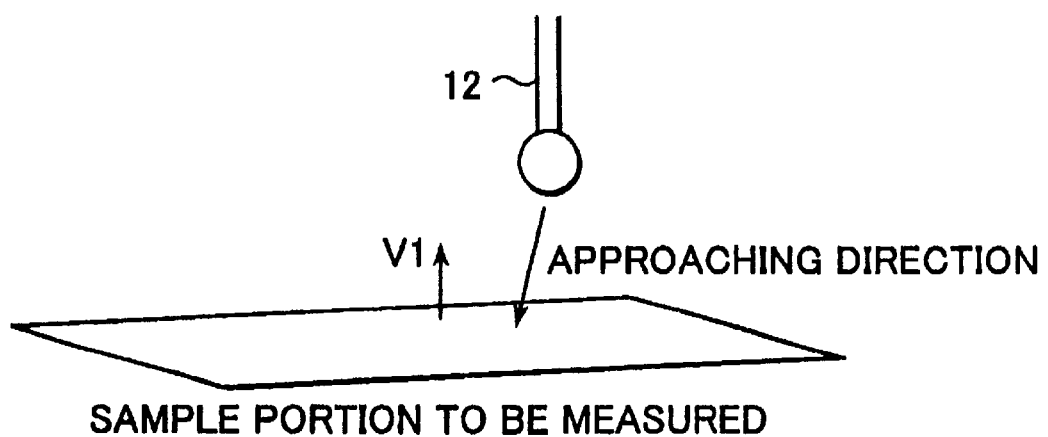
FIG. 13 illustrates a process of discriminating between a plane and a circle in the element discriminating process.
Figure 14:
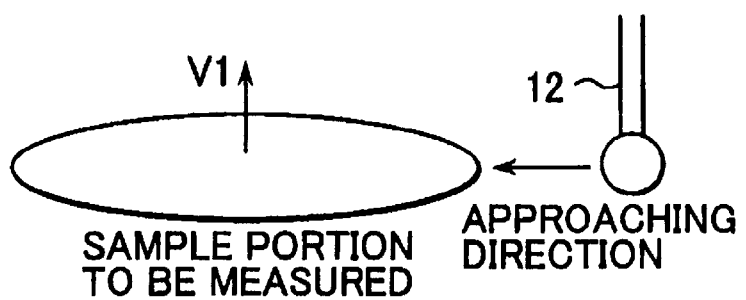
FIG. 14 illustrates a process of discriminating between a cylinder and a circular cone in the element discriminating process.

Next, the plane/circle discriminating process (S19) in the element discriminating process of FIG. 4 is described. This process is executed to finally determine whether the geometry element is a plane or a circle when the distribution of sample points is of the second degree. Specifically, when an absolute value of an inner product between a unit vector in the approaching direction of the probe 12 and the above vector V1 is equal to or more than √0.5≈0.7, it is discriminated as a plane. If the absolute value is less than √0.5≈0.7, it is discriminated as a circle. For example, as shown in FIG. 13, an angle between the direction of the probe 12 approaching to the sample portion and the thickness direction (V1 direction or H1 direction) is equal to or less than 45 degrees (usually about 0 degree), the geometry element is discriminated as a plane because the approaching is performed along the normal to the sample portion. To the contrary, as shown in FIG. 14, an angle between the approaching direction of the probe 12 to the sample portion and the thickness direction (V1 direction or H1 direction) is more than 45 degrees (usually about 90 degrees), the geometry element is discriminated as a circle because the approaching is performed in the direction of the side of the sample portion. An arbitrary value can be employed as the absolute value of the inner product for use in the discriminative reference. The approaching direction is defined herein as the moving direction of the probe immediately before it touches the work to be measured at the time of measurement. Though, it may be the moving direction of the probe after it touches the work or the opposite direction thereof.

The cylinder/cone discriminating process (S22) in the element discriminating process of FIG. 4 is performed specifically by: calculating a circular cone through the least square method using all measured data; determining that it is a cylinder if a half vertical angle calculated is equal to or less than a reference, for example, 0.01 rad.; and determining that it is a circular cone if the half vertical angle is more than the reference.

The present invention has been described above with exemplifying three-dimensional data obtained from the three-dimensional coordinate measuring machine, though needless to say, it can be applied to a process for discriminating geometry elements from two-dimensional data obtained from a surface form measuring instrument, for example.

In the above embodiments, such the configuration is described that comprises the measuring machine for measuring one or more sample points on a work required to calculate a geometry element to be measured and outputting measured data. Another configuration may be employed instead of the above measuring machine. It comprises an input section that is used to input measured data obtained by measuring one or more sample points on a work required to calculate a geometry element to be measured.

According to the present invention, it determines a distribution of one or more sample points on a work required to calculate a geometry element to be measured. On the basis of the distribution and the number of the sample points, it discriminates the geometry element to be measured. Therefore, it can determine the geometry element with much lesser computational complex than that of the conventional method, which performs application processes of all geometry forms and their error calculations based on measured data, thereby greatly reducing the computational complexity of data to achieve a high-speed processing with improved operability.

Having described the embodiments consistent with the present invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. An apparatus for measuring geometry elements, comprising:
   a two or three-dimensional coordinate measuring machine for measuring one or more sample points on a work required to calculate a geometry element which defines the work to be measured and outputting measured data containing two or three-dimensional coordinates;
   a sampling and sample processing section for receiving said measured data of said sample points measured by said two or three-dimensional coordinate measuring machine and counting the number of said sample points received; and an element discriminating section for discriminating a distribution of said sample points which is defined by any one of zero through third degrees, on the basis of a thickness, width and height of the minimum rectangular parallelepiped which internally contains all sample points received by said sampling and sample processing section and for discriminating said geometry element which defines the work to be measured on the basis of the number of said sample points received by said sampling and sample processing section and said distribution of said sample points.

2. The apparatus for measuring geometry elements according to claim 1 wherein said element discriminating section discriminates said geometry element as:
   a point when the number of said sample point is equal to 1;
   a line when the number of said sample points is equal to 2 or more and said distribution of said sample points being of the first degree;
   a plane or a circle when the number of said sample points is 2 or more and said distribution of said sample points being of the second degree;
   a sphere when the number of said sample points is equal to 4 or 5 and said distribution of said sample points being of the third degree; and
   a cylinder or a circular cone when the number of said sample points is equal to 6 or more and said distribution of said sample points being of the third degree.

3. The apparatus for measuring geometry elements according to claim 2, wherein said element discriminating section discriminates said geometry element, when the number of said sample points is equal to 2 or more and said distribution of said sample points being of the second degree, as:
   a plane if the approaching direction for measurement which is employed when at least the last sample point is obtained is vertically close to a plane defined by said sample points; and
   a circle if said measuring approach direction is parallel close to a plane defined by said sample points.

4. The apparatus for measuring geometry elements according to claim 3, wherein said element discriminating section calculates a half vertical angle of circular cone from said measured data, when the number of said sample points is equal to 6 or more and said distribution of said sample points being of the third degree, and discriminates said geometry element as:
   a cylinder if said half vertical angle is equal to or less than a predetermined value; and
   a circular cone if said half vertical angle is larger than said predetermined value.

5. The apparatus for measuring geometry elements according to claim 2, wherein said element discriminating section calculates a half vertical angle of circular cone from said measured data, when said the number of said sample points is equal to 6 or more and said distribution of said sample points being of the third degree, and discriminates said geometry element as:
   a cylinder if said half vertical angle is equal to or less than a predetermined value; and
   a circular cone if said half vertical angle is larger than said predetermined value.

6. An apparatus for measuring geometry elements, comprising:
   a two or three-dimensional coordinate measuring machine for measuring one or more sample points on a work required to calculate a geometry element which defines the work to be measured and outputting measured data containing two or three-dimensional coordinates;

a sampling and sample processing section for receiving said measured data of said sample points measured by said two or three-dimensional coordinate measuring machine and counting the number of said sample points received, said sampling and sample processing section determining the finish of reception of all sample points required to calculate said geometry element when a predetermined time is elapsed after the last measured data is received; and an element discriminating section for discriminating a distribution of said sample points which is defined by any one of zero through third degrees, on the basis of a thickness, width and height of the minimum rectangular parallelepiped which internally contains all sample points received by said sampling and sample processing section and for discriminating said geometry element which defines the work to be measured on the basis of the number of said sample points received by said sampling and sample processing section and said distribution of said sample points.

7. A method of measuring geometry elements, comprising the steps of:

receiving one or more sample points containing two or three-dimensional coordinates on a work required to calculate a geometry element which defines the work to be measured and counting the number of said sample points received;

determining a distribution of said sample points received in the step of receiving which is defined by any one of zero through third degrees, on the basis of a thickness, width and height of the minimum rectangular parallelepiped which internally contains all sample points received in the step of receiving; and discriminating said geometry element to be measured on the basis of said distribution of all sample points determined in the step of determining and the number of said sample points counted in the step of receiving.

8. A method of measuring geometry elements, comprising the steps of:

receiving one or more sample points containing two or three dimensional coordinates on a work required to calculate a geometry element which defines the work to be measured and counting the number of said sample points received;

determining the finish of reception of all sample points required to calculate said geometry element when a predetermined time is elapsed after the last sample point is received in the step of receiving; and discriminating said geometry element to be measured on the basis of a distribution of said sample points which is defined by any one of zero through third degrees, on the basis of a thickness, width and height of the minimum rectangular parallelepiped which internally contains all sample points received in the step of receiving and the number of said sample points after the finish of reception of all sample points is determined in the step of determining.

9. An apparatus for measuring geometry elements, comprising:

a sampling and sample processing section for receiving one or more sample points containing two or three-dimensional coordinates on a work required to calculate a geometry element which defines the work to be measured and counting the number of said sample points received; and an element discriminating section for discriminating a distribution of said sample points which is defined by any one of zero through third degrees, on the basis of a thickness, width and height of the minimum rectangular parallelepiped which internally contains all sample points received by said sampling and sample processing section and for discriminating said geometry element which defines the work to be measured on the basis of the number of said sample points received by said sampling and sample processing section and said distribution of said sample points.

* * * * *